United States Patent [19]

Landwer et al.

[11] 3,779,321

[45] Dec. 18, 1973

[54] DATA TRANSMITTING SYSTEMS

[75] Inventors: Donald C. Landwer, Arlington Heights, Ill.; Allan A. Lorenz, Mentor, Ohio

[73] Assignee: Teletype Corporation, Skokie, Ill.

[22] Filed: June 30, 1972

[21] Appl. No.: 267,789

Related U.S. Application Data

[63] Continuation-in-part of Ser. No. 104,380, Jan. 6, 1971, abandoned.

[52] U.S. Cl. .................. 178/66 R, 178/68, 325/30, 325/38 R

[51] Int. Cl. .......................................... H04l 27/02

[58] Field of Search .................. 325/30, 38 R, 66 R, 325/66 A, 67, 68; 340/170, 167; 332/53, 55, 23 R, 23 A

[56] References Cited

UNITED STATES PATENTS

| | | | |
|---|---|---|---|
| 3,454,718 | 7/1969 | Perreault | 178/66 R |
| 3,102,238 | 8/1963 | Bosen | 178/66 A |
| 3,142,723 | 7/1964 | Fleming | 178/66 A |
| 3,566,033 | 2/1971 | Young | 178/67 |

*Primary Examiner*—Benedict V. Safourek
*Attorney*—J. L. Landis et al.

[57] ABSTRACT

Successive bits of serial data modulate successive alternate cycles of an alternating current reference signal. The modulated reference signal is separated into its modulated and its unmodulated cycles, or components, which are then full wave rectified. One of the components is then phase-shifted in time and inverted so that the cycles of the modulated and the unmodulated components occur simultaneously. Both the modulated and the unmodulated components are then integrated and averaged to obtain a signal which is representative of the original serial signal.

13 Claims, 8 Drawing Figures

DATA TRANSMITTING SYSTEMS

This is a continuation-in-part of copending application, Ser. No. 104,380, filed Jan. 6, 1971 now abandoned.

BACKGROUND OF THE INVENTION

The present invention relates to methods and systems for the tranmission of data with a modulated reference signal, and in particular to a method and system wherein alternate cycles of the reference signal are modulated in accordance with the value of the data.

In transmitting intelligence in the form of a serial data signal from a magnetic tape reader or the like, a problem exists in that transmission errors are introduced as a result of line noise or eccentricities in the magnetic tape reader transport speed. Noise introduced on a transmission line may cause an erroneous message to be received at a receiving terminal, and a variation in the tape transport speed at a sending terminal may cause a loss of synchronization between the sending terminal and the receiving terminal, resulting in reception by the receiving data terminal of an erroneous data transmission.

An object of the invention is to provide methods and circuits for transmitting serial data from a tape reader to a receiver, such that the transmitted data is uninfluenced by line noise or eccentricities in the transmitter tape transport speed.

SUMMARY OF THE INVENTION

The foregoing and other objects of the invention are accomplished by providing an alternating current reference signal at a first frequency and a source of data signals at a second frequency, the second frequency being one-half the frequency of the first frequency, and by modulating alternate full cycles of the reference signal in accordance with the value of the data signals.

Preferably, the data signal is a binary data signal having first and second states, the reference signal is a sinusoidal wave signal, and a data signal in the first state does not modulate the reference signal while a data signal in the second state does modulate the reference signal. The modulated reference signal is separated into first and second components comprising its data modulated and its non-data modulated cycles, and the components are full-wave rectified. One of the components is then phase-shifted in time so that the cycles of the first and the second components occur simultaneously. Next, one of the components is inverted and both are integrated and averaged to obtain a representation of the binary data signal.

Other objects, advantages and features of the invention will be apparent from the following description of a specific embodiment thereof, when taken in conjunction with the appended drawings.

DETAILED DESCRIPTION OF THE INVENTION

Figures 1, 6:
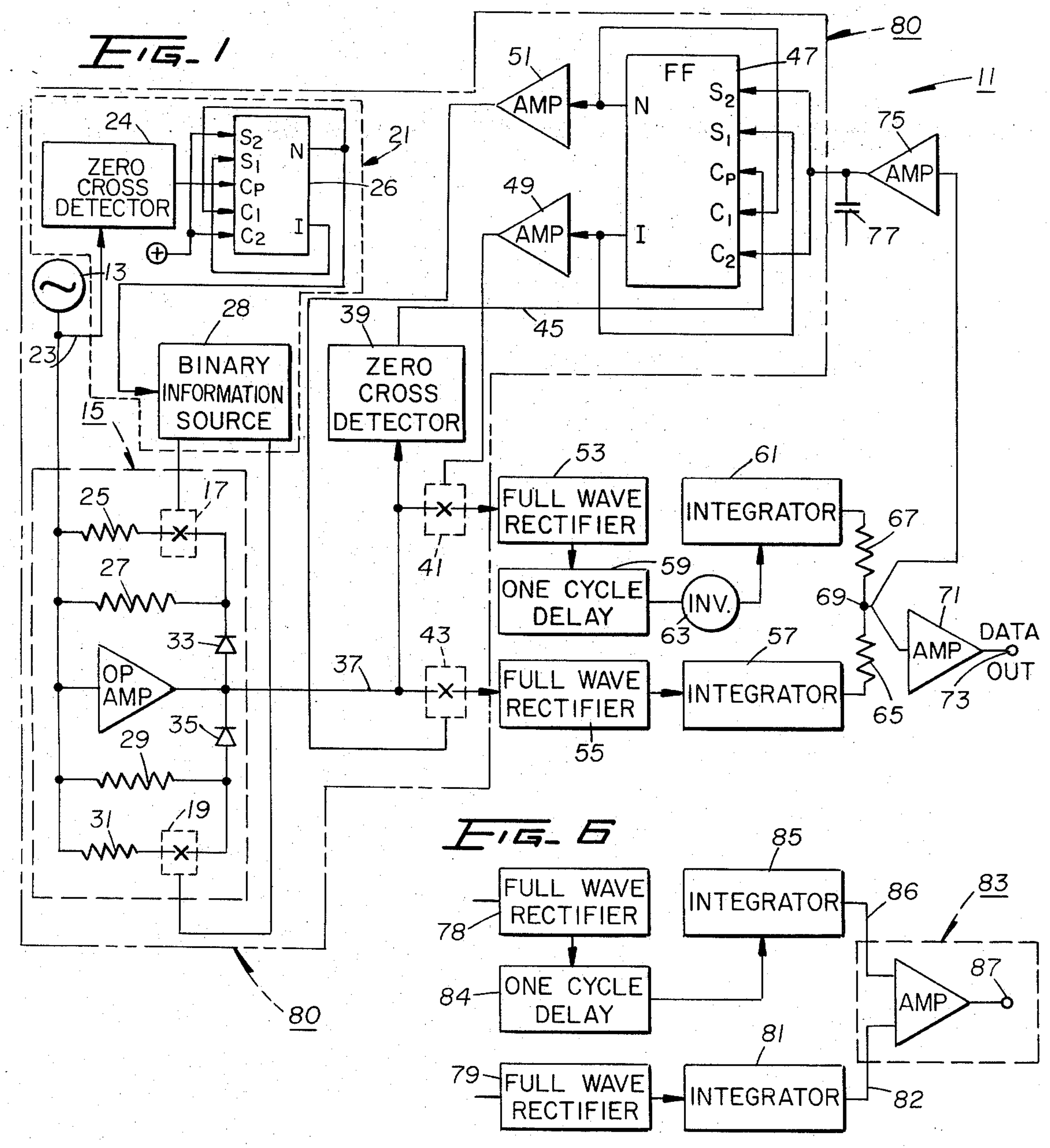
FIG. 1 is a schematic diagram of an embodiment of a circuit for practicing the method of the invention.
FIG. 6 is a schematic diagram of an alternate embodiment of a circuit for practicing the method of the invention.

Referring to FIG. 1 of the drawings, there is shown a data transmitting and receiving circuit 11 particularly adapted for practicing the present invention. The circuit 11 includes a reference wave generator 13 for supplying an alternating current, constant amplitude sinusoidal signal to the input of an operational amplifier circuit 15. The operational amplifier 15 is a high gain amplifier, and includes two electronic switches 17 and 19 which are both simultaneously either conductive (closed) or nonconductive (open) at various times in the operation of the circuit 11 in accordance with the value of a binary data signal provided by a source of data 21. The data source 21 is synchronized at an input 23 with the signal from the reference wave generator 13, such that a bit of data information is applied to the switches 17 and 19 on alternate or "data" cycles of the reference generator 13; designated as even cycles 2, 4, 6, 8, etc. in FIG. 2. The binary data source 21 includes a zero cross detector 24, a flip-flop 26 and a binary information source 28, and the synchronization of the binary data source 21 with the reference signal from the generator 13 to modulate the alternate full cycles thereof in accordance with the value of the binary data is accomplished by applying the signal from the reference wave generator 13 at the input 23 to the input of the zero cross detector 24. The zero cross detector 24 is responsive to each positive going zero crossing point of the signal from the reference wave generator 13 to generate a negative going pulse which is applied to a clock input of the flip-flop 26. With a positive potential applied to both the $S_2$ and $C_2$ inputs of the flip-flop 26, the flip-flop is enabled to switch back and forth, that is, to switch from its "normal" to its "inverted" state, and vice versa, in response to each pulse input from the zero cross detector 24. The normal output from the flip-flop 26 is applied as an input to the binary information source 28 to enable the binary information source to apply a bit of binary data information therewithin to the switches 17 and 19 whenever the flip-flop is in its normal state. Since the flip-flop 26 is in its normal state on alternate cycles of the signal from the reference wave generator 13, a bit of data information is applied to the switches 17 and 19 on alternate of data cycles of the signal from the generator 13. In this manner, the data source 21 applies data information to the switches 17 and 19 at a frequency which is one-half the frequency of the reference signal provided by the generator 13. For the purpose of this invention, the two states of the binary data are conventionally referred to a "marks" and "spaces", typically a positive reference voltage and ground, respectively. In the circuit 15, a mark acts to simultaneously close, or render conductive, and a space acts to simultaneously open, or render nonconductive, both of the switches 17 and 19.

The operational amplifier 15 is characterized in that the gain of the amplifier is dependent upon the feedback from the output of the amplifier to the input of the amplifier, the gain of the amplifier increasing as the feedback decreases, and decreasing as the feedback increases. This negative feedback is provided through four resistors 25, 27, 29 and 31 operating through two diodes 33 and 35. The diodes 33 and 35 allow feedback from the output of the amplifier 15 to the input of the amplifier during both the positive and the negative half cycles of the sinusoidal signal supplied by the reference wave generator 13.

The resistors 25 and 31 are in series with the electronic switches 17 and 19, respectively, and therefore the overall feedback from the output of the amplifier 15 to the input of the amplifier, and therefore the gain of amplifier, is dependent upon the state of the electronic switches 17 and 19. When the switches 17 and 19 are open, or nonconductive, the feedback from the output of the amplifier 15 to the input is decreased, and the gain is increased. Conversely, when the switches 17 and 19 are conductive, or closed, the feedback is increased, and the gain of the operational amplifier 15 is decreased.

Figures 2, 3, 4, 5, 7:
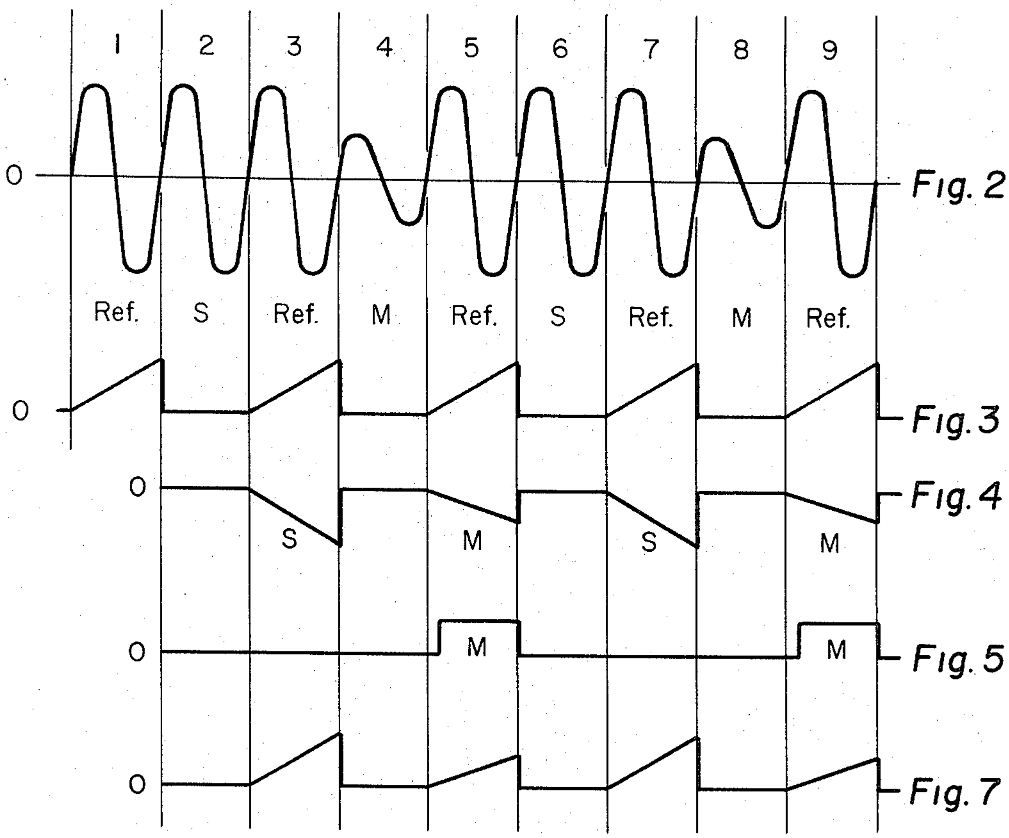
FIG. 2 shows a waveform of the output of the operational amplifier of FIG. 1 in response to a typical binary data input.
FIG. 3 shows a waveform of the integrated reference cycles of the waveform of FIG. 2.
FIG. 4 shows a waveform, which has been phase-shifted one cycle, of the both integrated and inverted data cycles of the waveform of FIG. 2.
FIG. 5 shows a waveform of the output of the circuit of FIG. 1 after the waveforms of FIGS. 3 and 4 have been averaged and amplified.
FIG. 7 shows a waveform of the integrated data cycles of the waveform of FIG. 2, as provided to the difference amplifier in the circuit of FIG. 6.

For the purpose of illustration, assume that a space-mark-space-mark signal (FIG. 2) is sequentially applied by the data source 21 to the electronic switches 17 and 19 during corresponding successive alternate cycles 2, 4, 6, 8 of the sinusoidal signal supplied by the reference wave generator 13. The space data bits (ground) operate to leave the electronic switches 17 and 19 non-conductive, and therefore the output signal, or transmission signal from the amplifier 15 on a conductor 37 during a space bit is of a first, or undamped, magnitude as illustrated in FIG. 2 for space data cycles 2 and 6. In this case, the switches 17 and 19 are nonconductive and the resistors 25 and 31 are not included in the feedback circuit, and the corresponding cycles of the reference signal are not modulated. However, when the mark data bits are applied to the switches 17 and 19 (cycles 4 and 8), the switches are rendered conductive to add the resistors 25 and 31 to the feedback circuit and to increase the feedback in the operational amplifier 15. This action decreases the gain of the amplifier 15 and provides on the conductor 37 a transmission signal consisting of a modulated, or damped, output of the corresponding cycles from the reference generator 13, which are lower in magnitude than the output cycles provided in response to an input from the reference generator 13 for a space data input to the switches 17 and 19.

As noted in FIG. 2, the space data bits do not modulate the amplitude of the output signal from the amplifier 15 while the mark data bits do modulate the amplitude, the degree of modulation by the mark data bits depending upon the value of the resistors 25 and 31. During the odd or reference cycles 1, 3, 5, 7, etc. of the generator 13, the data source 21 is effectively disconnected from the switches 17 and 19, which remain open regardless of the state of the data signal, so that an undamped reference output is supplied by the amplifier 15 during the odd cycles as depicted in FIG. 2.

The output transmission signal from the amplifier 15, which is the amplified reference signal from the generator 13 having alternate cycles thereof modulated in accordance with the value of the data from the data source 21, is carried by the conductor 37 to a receiving location, where it is applied to a zero cross detector circuit 39 and to one side of each of two electronic switches 41 and 43.

The zero cross detector 39 is responsive to each positive going zero crossing point of the transmission signal on the conductor 37 to generate a negative going pulse which is applied over a conductor 45 to a clock input of a flip-flop 47. With a positive signal applied to both the $S_2$ and $C_2$ inputs of the flip-flop 47, the flip-flop is enabled to switch back and forth, that is, to switch from its normal to its inverted state, and vice-versa, in response to each pulse input from the zero cross detector 39. The inverted output from the flip-flop 47 is applied through an amplifier 49 to the switch 41 to control the conductivity (open or closed condition) thereof, and the normal output is applied through an amplifier 51 to the switch 43 to control the conductivity thereof. The arrangement is such that the switches 41 and 43 are alternately rendered conductive in response to each output pulse from the zero cross detector 39, which in turn is generated in response to each positive-going zero crossing of the transmission signal on the conductor 37. In this manner, since the data modulated cycles and the non-data modulated, or reference, cycles of the transmission signal alternately occur after each positive-going zero crossing of the transmission signal, the data modulated cycles are conducted through one of the switches 41 or 43 and the non-data modulated cycles are conducted through the other switch. In other words, the transmission signal is separated into two components, the data modulated cycles and the non-data modulated, or reference, cycles, by the alternate switching action of the switches 41 and 43.

If the condition of the circuit is initially such that when a transmission signal is on the conductor 37 the switch 41 is conductive during the data modulated cycles thereof and the switch 43 is conductive during the reference cycles thereof, then, as will be evident later, a positive input is provided at the inputs S2 and C2 of the flip-flop 47, the flip-flop 47 is responsive to switch with each pulse from the zero cross detector 39, and the transmission signal is separated into its two components. In this case, the switch 41 is closed during the data cycles 2, 4, 6 and 8 to carry the data cycles of the transmission signal to a full-wave rectifier 53, and the switch 43 is closed during the reference cycles 1, 3, 5 and 7 to carry the reference cycles to a full-wave rectifier 55; thus, the data cycles are separated from the reference cycles to provide two separate signals for comparison.

The output from the full wave rectifier 55 is applied to an integrator circuit 57, the output of which is shown in FIG. 3 of the drawings. The output from the full wave rectifier 53 is applied to a one cycle delay, or phase-shifting circuit 59, which delays the data modulated cycles one full cycle, with respect to the transmission signal, so that the data modulated cycles correspond in time with the non-data modulated cycles.

The delay 59 in turn applies the data modulated cycles to an integrator circuit 61 through an inverter 63, the output of the integrator circuit 61 being shown in FIG. 4 of the drawings. The outputs from the integrators 57 and 61 are applied to identical series-connected resistors 65 and 67, respectively, which function as a voltage divider network to average, or compare, the two integrator output signals at a juncture 69.

Referring to FIGS. 3 and 4, with the switch 41 conducting the data cycles of the transmission signal and with the switch 43 conducting the reference cycles, the signal at the juncture 69 will always be either 0 volts or a voltage more positive than zero. The signal at the juncture 69 is applied to a threshold amplifier 71, which is responsive to the signal to provide a positive going output when the value of the signal is greater than a predetermined value, slightly greater than 0 volts in the example, as illustrated in FIG. 5. As may be seen by reference to FIGS. 3, 4 and 5, the value of the average signal exceeds 0 volts only when the data source 21 provides a mark to the amplifier 15 and thereby modulates, or dampens, a corresponding cycle of the reference wave supplied by the generator 13. At all other times the signals shown in FIGS. 3 and 4 are equal in magnitude and opposite in sign, and therefore when averaged equal 0 volts. Appropriate conventional sampling circuitry (not shown) samples the data at an output 73 of the amplifier 71 to obtain a representation of the signal provided by the data source 21.

The foregoing description of the operation of the circuit of the invention covers the situation where the circuit is initially in such a condition, when a transmission signal is on the conductor 37, that the data modulated cycles of the transmission signal are conducted through the switch 41 and the reference cycles are conducted through the switch 43. Assume, however, that the opposite condition occurs; that is, when a transmission signal is on the conductor 37, the circuit is in such a condition that the reference cycles of the transmission signal are initially conducted by the switch 41 and the data modulated cycles are initially conducted by the switch 43. In this case, the output of the integrator 61, as applied to the resistor 67, is an inverted representation of FIG. 3, and the output of the ingegrator 57, as applied to the resistor 65, is an inverted representation of FIG. 4. Therefore, the signal at the juncture 69, which is an average of the signals represented by inverted FIGS. 3 and 4, will be 0 volts or a voltage more negative than zero.

The signal at the juncture 69, as well as being applied an an input to the amplifier 71, is also applied to the input of an amplifier 75, the output of which is applied to the S2 and C2 inputs of the flip-flop 47. The amplifier 75 is characterized in that with either a 0 volt or a positive voltage signal applied as an input thereto, a positive output is obtained therefrom, while with a negative voltage signal applied as an input thereto, a 0 volt output is obtained therefrom.

In the case where the data modulated cycles are conducted by the switch 41, the input to the amplifier 75, which is the signal at the juncture 69, is always either 0 volts or positive, the output from the amplifier 75 is always positive, and the flip-flop 47 is always enabled to switch back and forth in response to pulses from the zero cross detector 39, so that the data modulated cycles will always be conducted by the switch 41. However, if as in the instant situation the data modulated cycles are conducted by the switch 43, upon the occurrence of the first data modulated cycle representing a mark the signal at the juncture 69 becomes negative. This negative signal lasts for the duration of a cycle, and is applied to the amplifier 75 to switch the output thereof to 0 volts. With 0 volts on its S2 and C2 inputs, the flip-flop 47 is inhibited from changing states in response to a pulse at its clock input from the zero cross detector 39. A capacitor 77, connected to the output of the amplifier 75, maintains the 0 volts applied to the S2 and C2 inputs of the flip-flop 47 beyond the end of the cycle, when the output of the amplifier 75 would otherwise immediately become positive, so that the flip-flop 47 is not enabled to respond to the next pulse from the zero cross detector 39. In this manner, reversing the energizing of the switches 41 and 43 is delayed for one full cycle of the transmission signal, and subsequent data modulated cycles thereof are conducted by the switch 41. Thereafter, the potential at the juncture 69 will always be 0 volts or a positive voltage, and the flip-flop 47 will always be enabled to respond to pulses from the zero cross detector 39.

An alternate circuit for obtaining a representation of the data signal from the modulated reference wave is shown in FIG. 6, wherein the portion of the circuitry (not shown) preceding the two full wave rectifiers 78 and 79 is identical with the circuitry shown in phantom lines in FIG. 1 which precedes the rectifiers 53 and 55, and which is identified generally as 80. In the operation of this circuit, the flip-flop 47 is always enabled to respond to pulses from the zero cross detector 39, to alternately render the switches 41 and 43 conductive, by a constant application of a positive potential (not shown) to its S2 and C2 inputs. When a transmission signal is on the conductor 37, the alternate action of the switches 41 and 43 separates the data component of the signal from the reference component, and applies one of the components to the full wave rectifier 78 and the other component to the full wave rectifier 79. Whether the data component is conducted by the switch 41 or 43 is dependent upon the condition of the circuit 80 at the time a transmission signal is applied over the conductor 37. However, as will be evident after a complete description of the circuit of FIG. 6, it does not matter which switch 41 or 43 conducts the data component, as the representation of the original data signal as obtained from the cirucit is the same irrespective of which switch conducts the data component.

The component conducted by the switch 43, after being rectified by the rectifier 79, is integrated by an integrator 81 and applied over a conductor 82 to a first input of a difference amplifier 83. The component conducted by the switch 41, after being rectified by the rectifier 78, is applied to a one cycle delay 84 which delays the cycles of that compoennt so that they correspond in time with the cycles of the other component. The output from the delay 84 is in turn applied to an integrator 85, the output of which is applied over a conductor 86 to a second input of the difference amplifier 83. The signals on the conductors 82 and 86 are represented by the signals of FIGS. 3 and 7, the signal on the conductor carrying the data component being represented by FIG. 7 and the signal on the conductor carrying the reference component being represented by FIG. 3.

The difference amplifier 83 is characterized in that, when a potential difference exists between its two inputs, a positive output is provided at a terminal 87, and when a potential difference does not exist, a 0 volt output is provided. Referring to FIGS. 3 and 7, it is seen that a potential difference between the two inputs to the difference amplifier 83 exists only when the data source 21 operates to supply a mark indication to the amplifier 15. The output of the difference amplifier 83, as present on the terminal 87, is as shown in FIG. 5.

Figure 8:
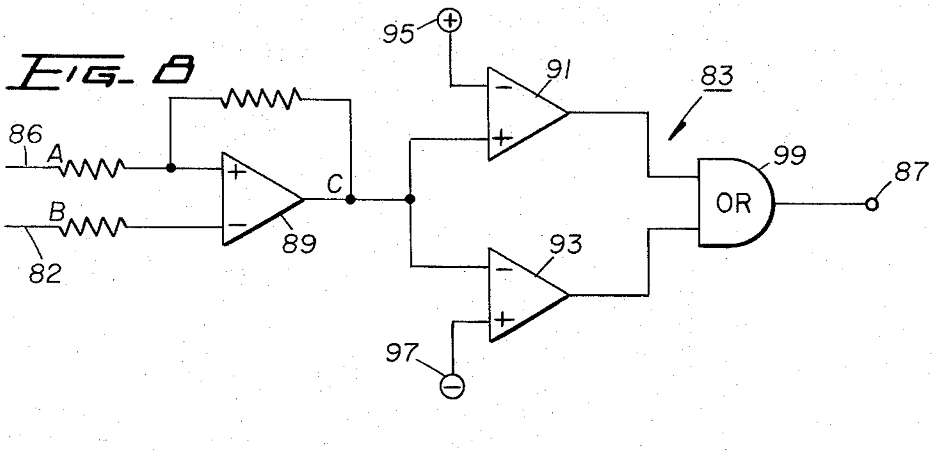
FIG. 8 shows a typical difference amplifier circuit of a type represented by the difference amplifier of FIG. 6.

The difference amplifier of FIG. 6, referred to generally as 83, may be of conventional circuitry such as that shown in FIG. 8, wherein each conductor 82 and 86 carries an input to an operational amplifier 89. If the value of the signal on the conductor 86 is A, and if the value of the signal on the conductor 82 is B, then the value C of the output of the operational amplifier may be expressed as:

$$C = A - B = 0$$

where $A$ is equal to $B$, and $$C = A - B = \pm X$$

where $A$ is either less than or greater than $B$, and where $X$ is the difference in their magnitude multipled by the amplification factor of the operational amplifier 89.

The output from the amplifier 89, having the value $C$, is applied to the non-inverting input of a comparator 91 and to the inverting input of a comparator 93. The inverting input of the comparator 91 is connected to a source of positive voltage 95 having a potential slightly greater than 0 volts, but significantly less than the average value of $+X$, and the non-inverting input of the comparator 93 is connected to a source of negative voltage 97, having a potential slightly less than 0 volts, but significantly greater than average value of $-X$. The comparators 91 and 93 are characterized in that a 0 volt output is obtained therefrom whenever the voltage potential applied to the non-inverting input is less than the voltage potential applied to the inverting input, and in that a positive voltage output is obtained therefrom whenever the opposite input condition occurs.

The output from each comparator 91 and 93 is applied as a different input to an OR gate 99, the output from the OR gate 99 providing a signal to the terminal 87. Whenever $$C = 0,$$

which occurs whenever $$A - B = 0,$$

the potential applied to the non-inverting input of each comparator 91 and 93 is less than the potential applied to the inverting input of that comparator, the output of each comparator is 0 volts, and the output of the OR gate 99 is 0 volts. Therefore, the output of the OR gate 99 is 0 volts whenever the data source 21 operates to supply a space indication to the amplifier 15.

If, however, the data source 21 supplies a mark indication to the amplifier 15, then $A$ does not equal $B$ and $$C = A - B = \pm X$$

in accordance with whether $A$ is positive or negative with respect to $B$. In this case, the potential at the non-inverting input of one of the comparators 91 or 93 is positive with respect to the potential at the inverting input of that comparator, and a positive potential is obtained at the output of that comparator and applied to one of the inputs of the OR gate 99, which in turn provides a positive potential at its output.

It is to be noted that a positive output is obtained from one of the comparators 92 and 93 whenever $A$ does not equal $B$, irrespective of whether $A$ is positive or negative with respect to $B$. For example, if $$A - B = +X,$$

then the non-inverting input of the comparator 91 is positive with respect to the inverting input thereof and a positive input is provided by the comparator 91 to the OR gate 99. Similarly, if $$A - B = -X,$$

then the non-inverting input of the comparator 93 is positive with respect to the inverting input thereof, and a positive input is provided by the comparator 93 to the OR gate 99. Therefore, the representation of the data signal at the terminal 87, as shown in FIG. 5, is the same irrespective of whether the data component of the transmission signal is conducted by the switch 41 or 43.

It may now be understood how the method of transmitting data as just described results in a transmitted data signal that is free from errors resulting from line noise or eccentricities in the data source read out speed. For example, referring to the circuit of FIG. 1, if noise of a fairly constant magnitude, which has a duration greater than two cycles of the reference signal provided by the generator 13 is introduced onto the transmission line between a transmitting terminal and a receiving terminal, which transmission line is represented by the conductor 37, the noise, after going through the rectifiers 53 and 55, the delay 59, the invertor 63, and the integrators 57 and 61, will be summed and canceled by the resistors 65 and 67 at the juncture 69, and will therefore not affect the data as received at the threshold amplifier 71. Likewise, if the circuit of FIG. 6 were employed, the noise levels applied to the inputs of the difference amplifier 83 would be equal in magnitude and would therefore not result in an output from the difference amplifier. Also, eccentricities in the rate at which data is applied by the data source to the switches 17 and 19 will not affect accurate data transmission since the zero crossing point detector 39 is synchronized to zero crossing points at the output of the amplifier 15, and not to the rate at which data is applied by the data source 21 to the amplifier 15.

While one specific embodiment of the invention has been described in detail, it will be obvious that various modifications may be made from the specific details described without departing from the spirit and the scope of the invention. For example, in place of the sinusoidal wave generated by the reference generator 13, a generator may be employed wherein square waves are generated. Or, only one of the switches 17 or 19, with its associated resistors and diode, may be used — use of only the switch 17 and its associated resistors 25 and 27 and diode 33 operating to modulate only the positive, or top, portion of the alternate data modulated cycles of the reference wave, and use of only the switch 19 and its associated resistors 29 and 31 and diode 35 operating to modulate only the negative, or bottom, portion of the alternate data modulated cycles of the reference wave, the operation of the circuit being otherwise as above described.

What is claimed is:

1. A method of transmitting data, which comprises:
providing an alternating current reference signal at a first frequency;

providing, at a second frequency, which is one-half the frequency of the first frequency, a source of data signals, and modulating alternate full cycles of the reference signal in accordance with the value of the data signal.

2. The method as recited in claim 1, wherein:

providing a source of data signals comprises providing data signals having either a first or a second state, and modulating alternate full cycles of the reference signal comprises modulating the reference signal if the data signal is in the second state and not modulating the reference signal if the data signal is in the first state.

3. The method as recited in claim 1, further comprising:

separating the reference signal into first and second components comprising its data modulated and non-data modulated cycles, respectively, and comparing the cycles of the first and second components to obtain a representation of the data signal.

4. The method as recited in claim 3, wherein comparing the cycles of the components of the reference signal comprises:

rectifying both of the components;

phase-shifting one of the components so that the cycles of that component occur simultaneously with the cycles of the other component, and comparing the cycles of the phase-shifted and the non-phase-shifted components to obtain a representation of the data signal.

5. The method as recited in claim 4, wherein:

providing a source of data signals comprises providing a binary data signal having either a first or a second state;

modulating alternate cycles of the reference signal comprises modulating the reference signal if the data signal is in the second state and not modulating the reference signal if the data signal is in the first state, and wherein comparing the cycles of the phase-shifted and the non-phase shifted components comprises:

inverting one of the components;

integrating both of the components, and averaging the cycles of the integrated components to obtain a binary representation of the data signal.

6. A method of encoding and decoding binary data signals, which comprises:

providing an alternating current reference signal at a first frequency;

providing a source of binary data signals at a second frequency, the second frequency being one-half of the frequency of the first frequency;

encoding the reference signal by modulating only alternate full cycles of the reference signal in accordance with the value of successive data signals, such that a data signal of a first type does not affect the amplitude of the reference signal and a data signal of the second type changes the amplitude of that cycle of the reference signal;

transmitting the encoded reference signal to a receiving location, and decoding the reference signal at the receiving location in accordance with the differences in amplitude between the data modulated cycles, and the non-data modulated cycles, of the reference signal.

7. The method according to claim 6, wherein the decoding step comprises:

separating the modulated reference signal into first and second components comprising its data modulated and its non-data modulated cycles, respectively;

applying the first component to one conductor of first and second conductors and the second component to the other conductor of the first and second conductors;

sensing whether the first component is being applied to the first or the second conductor and, if the first component is being applied to the second conductor, reapplying the first and the second components to the two conductors so that the first component is applied to the first conductor, and comparing the cycles of the first component with the cycles of the second component to obtain a representation of the data signal.

8. The method according to claim 7, wherein the comparing step comprises:

rectifying the cycles of the components on the first and the second conductors;

phase-shifting one of the rectified components so that the cycles of the first and the second components occur simultaneously;

inverting one of the rectified components;

integrating both of the components, and averaging the values of the cycles of the integrated components to obtain a representation of the binary data signal.

9. A circuit for transmitting data, which comprises:

means for providing an alternating current reference signal at a first frequency;

a source of data signals for providing data at a second frequency, the second frequency being one-half the frequency of the first frequency, and means for modulating alternate full cycles of the reference signal in accordance with the value of the data signal.

10. The circuit as recited in claim 9, further comprising means for separating the reference signal into first and second components comprising its data modulated cycles and its non-data modulated cycles, respectively;

means for rectifying both of the components;

means for phase-shifting one of the components so that the cycles of both of the components occur simultaneously;

an inverter, for inverting one of the components;

means for integrating the components, and means for comparing the components to obtain a representation of the binary data signal.

11. A circuit for encoding and decoding a binary data signal to be sent from a transmitting location to a receiving location, which comprises:

a source of constant amplitude sinusoidal reference signals at a first frequency;

a source of binary data signals at a second frequency, the second frequency being one-half the frequency of the first frequency the value of the binary data signals being governed by intelligence to be transmitted;

means for modulating alternate cycles of the reference signal in accordance with the value of the binary data signal to generate a transmission signal having the same frequency as the reference signal, the modulating means operating so that data bits of a first type do not amplitude modulate a corresponding cycle of the reference signal and so that data bits of a second type do;

means for transmitting the transmission signal to a receiving location, and means, at the receiving location, for generating a representation of the data signal in response to the transmission signal.

12. A circuit as recited in claim 11, wherein the generating means comprises:

first and second conductors;

means for applying the data modulated cycles of the transmission signal to one of the conductors and the non-data modulated cycles of the transmission signal to the other conductor;

means for sensing whether the data modulated cycles of the transmission signal are being applied to the first or the second conductor;

means, responsive to the data modulated cycles being applied to the second conductor, to reapply the cycles, so that the data modulated cycles are applied as a first signal to the first conductor and so that the non-data modulated cycles are applied as a second signal to the second conductor, and means for comparing the cycles of the first signal with the cycles of the second signal to obtain a representation of the data signal.

13. A circuit as recited in claim 12, wherein the comparing means comprises:

first and second rectifiers, for rectifying the first and second signals, respectively;

means for phase-shifting one of the signals, so that the cycles of the first and the second signals occur simultaneously;

an inverter for inverting one of the signals;

first and second integrators, for integrating the first and second signals, respectively, and means for averaging the values of the first and second integrated signals to obtain the representation of the data signal.

* * * * *